US006782095B1

United States Patent
Leong et al.

(10) Patent No.: US 6,782,095 B1
(45) Date of Patent: Aug. 24, 2004

(54) METHOD AND APPARATUS FOR PERFORMING SPECTRAL PROCESSING IN TONE DETECTION

(75) Inventors: Michael Leong, Montreal (CA); Yuriy Zakharov, Moscow (RU); Sergey Fedorov, Moscow (RU); Galina Titova, Moscow (RU)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/355,394

(22) PCT Filed: Nov. 27, 1997

(86) PCT No.: PCT/RU97/00377

§ 371 (c)(1),
(2), (4) Date: Jul. 27, 1999

(87) PCT Pub. No.: WO99/29084

PCT Pub. Date: Jun. 10, 1999

(51) Int. Cl.[7] .............................................. H04M 3/00
(52) U.S. Cl. .................. 379/386; 379/399.02; 708/312; 708/405; 708/406; 370/345
(58) Field of Search ........................... 702/77; 379/386, 379/418; 708/406, 405, 312

(56) References Cited

U.S. PATENT DOCUMENTS

| 4,628,158 A | * | 12/1986 | Rubin |
| 4,669,114 A | * | 5/1987 | Reesor et al. |
| 4,748,579 A | * | 5/1988 | Zibman et al. ............. 364/726 |
| 4,901,333 A | * | 2/1990 | Hodgkiss |
| 5,162,723 A | * | 11/1992 | Marzalek et al. ............. 324/77 |
| 5,311,589 A |   | 5/1994 | Bennett et al. |
| 5,325,427 A | * | 6/1994 | Dighe |
| 5,353,344 A |   | 10/1994 | Knitsch |
| 5,353,346 A | * | 10/1994 | Cox et al. |
| 5,471,534 A | * | 11/1995 | Utter .............................. 381/4 |
| 5,666,357 A | * | 9/1997 | Jangi |
| 5,774,837 A | * | 6/1998 | Yeldener et al. ............ 704/208 |
| 5,787,387 A | * | 7/1998 | Aguilar ....................... 704/208 |
| 5,809,133 A | * | 9/1998 | Bartkowiak et al. |
| 6,098,088 A | * | 8/2000 | He et al. ..................... 708/406 |

FOREIGN PATENT DOCUMENTS

EP        91100251.7        7/1991

\* cited by examiner

Primary Examiner—F. W. Isen
Assistant Examiner—Ramnandan Singh

(57) ABSTRACT

A general purpose network tone detection method and apparatus that allows the precise and accurate recognition of North American tones (MF, DTMF (Dual-Tone Multifrequency), and CPT (Call Progress Tones)) and international MF-R2 tones as well as taking into consideration other common tones such as Calling Card Service Prompt and Recall Dial. Through the use of the Discrete Fourier Transform (DFT) on small time windows and by providing phase continuity between these windows, the results of the successive DFTs may be combined and processed by a second DFT computation. This second DFT allows higher frequency resolution without requiring the re-computation of the DFT from the time samples. The resulting effect is a tone receiver with both high time and frequency resolution which consequently leads to robust and accurate tone recognition systems conforming even to the most stringent specification while maintaining low computational requirements.

31 Claims, 11 Drawing Sheets

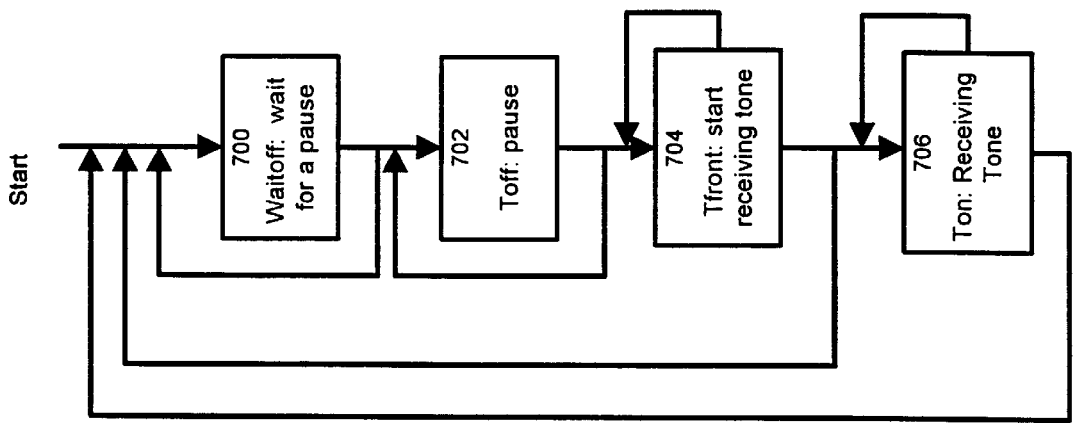

METHOD AND APPARATUS FOR PERFORMING SPECTRAL PROCESSING IN TONE DETECTION

FIELD OF THE INVENTION

This invention relates to a method and an apparatus for detecting and discriminating between various types of electronic signals. More specifically it relates to telephone call processing and is particularly applicable to multi-frequency (MF), dual-tone multi-frequency (DTMF), call progress tone (CPT) and MF-R2 tone receivers specifically in the area of telephone networks.

BACKGROUND OF THE INVENTION

Telephone service providers increasingly supply a wide variety of options and features to subscribers, such as call waiting, three-way calling, credit card calling among many others. All these services are implemented to provide customers with conveniences and facilities that were unavailable a few years back. In order to achieve communication between various units of a telephone network and with users and hence provide these services, telephone systems require various types of control signals. These signals include tones which are used to convey information to the system from the user or, alternatively, to inform the user of the current status of a telephone transaction. Tones may also be used to communicate between switches and other parts of the telephone network itself.

The correct detection of a tone is crucial to the functioning of the telephone network since the latter relies on them for operations such as dialling, billing and coin identification. Users also rely on these tones for information such as busy, dialling and dial tone. As a concrete example, automatic redial when faced with a billing signal and recognition of an incoming fax would not be possible without accurate tone recognition.

Four categories of signalling are commonly used each with its own specifications and purposes. They are multi-frequency (MF) tones, dual-tone multi-frequency tones (DTMF), international MF-R2 tones and call progress tones (CPT). There are other signalling sequences that are not mentioned here since their purposes are similar in nature to the four signalling conventions mentioned above. Two separate devices are involved in the tone communication process: the transmitter, which creates and propagates the tones, and the receiver, which receives and decodes them.

The correct detection of a tone by the receiver implies that the signal originating from a transmitter station is accurately decoded by the receiver as being the transmitted tone. Correct detection by the receiver of a digit encoded using any signalling methods also requires both a valid combination of frequencies and the correct timing element. A valid combination of frequencies implies that the receiver is able to discern that there is only the specified frequencies present and that these frequencies are located at or at least within reasonable distance of the nominal values. Furthermore the receiver is also able to verify within reasonable accuracy that the amplitude, twist and other characteristics of the tone conforms to certain pre-determined values. The receiver should also be able to obtain within reasonable accuracy the duration of a tone in order to determine if it is valid when compared to pre-determined duration requirements such as inter-tone gaps, cadence and other temporal specifications.

Detection of tones is a problem that has been addressed in the past. For example Bennett et al., U.S. Pat. No. 5,311,589 assigned to AT&T Bell Laboratories, describes a method to process DTMF and CPT tone using the Goertzel algorithm and a logical processing stage. The contents of his document are incorporated herein by reference.

Tone receiver systems have been developed in many parts of the world and, although it is difficult to describe a standard tone receiver architecture, some characteristics are shared between many of them. FIG. 1 illustrates a typical tone receiver system as present in the prior art. A typical tone communication system of the type depicted in FIG. 1 generally comprises a device such as a transmitter 102 which encodes and transmits pulses serially in a communication channel 104. The transmitter 102 could be a simple touch-tone telephone or be included as part of a telephone switch. A combination of the pulses transmitted constitutes a tone which typically has frequencies in the voice range (~180–3600 Hz). Hence, in a telephone network, the communication channel is the voice channel. At the other end of the channel a receiver 100 is connected. The receiver 100 monitors the communication channel, detects and decodes the signal and, in turn, transmits the decoded information to another device such as a controller 116.

The receiver 100 can be separated into five functional blocks namely an anti-aliasing low-pass filter 105, an analog to digital (A/D) converter 106, a storage buffer unit 108, a spectral processor 110 and a logical processor 112. Although a few receivers still use the analog signal directly, the trend is clearly towards digitization because it can be processed by a digital computer and be implemented on an easily programmable DSP chip. Therefore, the prior system shown here uses digital signals; however, the same explanations are valid for analog receiver which use similar analog components. In certain circumstances, the incoming signal may be digital. In these cases the A/D converter 106 would not be required. Typically, the incoming signal is digitally sampled by an analog to digital (A/D) 106 converter and assembled into frames in a storage buffer unit 108. These frames are then analysed at predetermined frequencies in order to obtain the frequency characteristics of the signal during that frame. Generally, the analysis is performed in two separate units 110 112.

The spectral processor 110 analyses the spectral characteristics of the samples received from the storage buffer unit 108 to obtain frequency and amplitude information for each frame. This analysis is similar for all types of signals differing perhaps by the frequencies analysed. Furthermore, this operation requires large computational power and limits the system in its processing capability. Traditionally, the spectral properties of tones have been detected by means of a bank of bandpass filters, one for each possible frequency in the tone. This is shown in FIG. 2 for the detection of a Multi-Frequency (MF) tone. The filters 200 202 204 206 208 210 may be digital or analog, and are used to estimate the energies of narrow bands of the spectrum in order to obtain a frequency representation of the signal. The bands are centred at the frequencies of interest and their width is chosen to reflect the frequency tolerance of the receiver of each analysed frequency. In the case of MF signalling, a tone is registered as present if and only if there is sufficient energy in two spectral bands. This can be verified by means of devices comprising an energy computation and a pre-determined amplitude threshold 212 214 216 218 220 222. Another technique that can also be commonly used is to analyse the spectral characteristics of the signals involves the computation of the Discrete Fourier Transform (DFT). Typically the DFTs are computed only at the frequencies of interest and result in an estimation of energy in the frequency domain. This method is described in detail in "Discrete-Time Processing of Speech Signals" by Deller, Proakis and Hansen, Macmillan Publishing Company New York 1993 whose contents are hereby incorporated by reference. Energy estimates obtained at this stage are propagated to the logical processing stage 112.

The logical processing stage 112 determines, based on the information obtained from the previous stage, if a valid tone has been detected by evaluating the temporal and logical characteristics in the signal. Using the computed amplitude of each frequency, a candidate tone is determined for each frame and is often compared to previous frames for continuity. For instance, in the case of MP signalling, two and only two frequencies must be above the energy threshold. In any other circumstance either the signal should be ignored or an error should be reported. The temporal characteristic involves comparing the duration and cadence of the tone with respect to some reference template. In the case of MF and DTMF signals this temporal analysis is limited to short time duration signals typically in the range of 10 ms to 40 ms. For example, in the case of a DTMF digit with a frame length of 10 ms, three consecutive frames are compared in order to conform to established standards and obtain 30 ms duration for the tone. In the case of a CPT tone, a larger number of frames may be required to verify if the pattern of the given tone matches a predefined pattern with the same frequencies. A detailed description of logical processing can be found in Bennett et al., U.S. Pat. No. 5,311,589 assigned to AT&T Bell Laboratories for both CPT and DTMF tones. Once either a valid tone or no tone has been detected, the result is sent to another device such as a controller 116 that uses the decoded information. The type of computation performed in the logical processing block is generally not computationally intensive and varies a lot between different signalling protocols.

Tone receivers of the type described above have been used in the past in tone detection and recognition systems. Such systems are often integrated into telephone networks where the different modules of the communication channels are able to communicate by sending and receiving various tones. The difficulty concerning the detection of tones is two-fold.

The first problem lies in the fact that many different types of signals are currently in use or will be introduced in the future. A main deficiency of the current systems is their lack of flexibility and the difficulty of reprogramming the Discrete Fourier Transform (DFT) in order to adapt to new tones such as Special Information tones (SIT), fax calling tones, recall dialling tones amongst many others. This difficulty implies considerable efforts in the redesign of new systems to accommodate these new tones and hence considerable costs.

The other problems of detecting tones arise from the nature of the telephone network itself. In the normal course of tone detection it may occur that a speech utterance is mistaken for a tone, that a tone is not detected or that a given tone is mistaken for another. Although dual frequencies in MF, DTMF and CPT were chosen to be non-harmonically related and hence have little resemblance to the harmonic characteristic of the human voice, these tones have frequencies located on the same band as speech (~180–3600 Hz). Human speech as well, has many fundamental and harmonic frequencies located in that band which causes a situation called "talk-off". Talk-off occurs when human speech, music or other sounds are mistaken for a tone in a telephone network context. This problem is compounded by noise on the lines since noise may occur in all frequency bands.

Another difficulty resides in providing precise control over the frequency spectrum. About a nominal candidate frequency $F_o$, which is one of the frequencies of a given tone, a small error margin is accepted to take channel distortions and other physical effects into account. The old band-pass filter technique does not allow precise control of the frequency tolerance bands unless the filter order is very elevated which in turn is costly. As a result, the false classification of a detected tone may occur or alternatively, speech signals may be mistaken for an audible tone.

Another problem lies in the difficulty in providing precise control of the time duration of a signal that is caused by the long. frames required to have a high frequency resolution. In order to have a high frequency resolution in DFT computations and hence be able to distinguish smaller and smaller portions of the frequency spectrum, a long time interval or window is required. By doing so, the time resolution and hence the capacity of distinguishing between short time intervals is decreased. This is known as the frequency/time resolution trade-off.

Furthermore, band-pass filters and the traditional DFT computation are not reliable with tones distorted with Gaussian noise, impulse noise, speech signal, tone interruptions, time shifts between frequency components and those having ambiguous transition time zones between two states. This type of interference is very common in telephone networks where the transmission lines are subject to atmospheric conditions and an uncontrollable environment.

Thus, there exists a need in the industry to provide a tone detection receiver particularly well suited to telephone networks that is capable of a high degree of flexibility, accuracy and robustness, can be adapted to the majority of current and future signalling protocols with minimal difficulty and which maintain high computational efficiency, and finally that is capable of providing a precise control over the acceptance and rejection bands for both time and frequency domain parameters of the tone in order to reduce false detection events.

OBJECTS AND STATEMENT OF THE INVENTION

A principal object of the invention is to provide an improved tone receiver, particularly well suited for use in telephone networks.

Another object of the invention is to provide an improved method for performing tone detection and recognition processes, particularly well suited in the context of a telephone network.

As embodied and broadly described herein the invention provides a tone detection apparatus, said apparatus comprising:

an input for receiving a digital signal potentially containing a tone detectable by said apparatus;

DFT computation means for computing a discrete Fourier transform coefficient for at least one candidate frequency for each sub-frame in a set of successive sub-frames of the digital signal, each sub-frame containing a plurality of signal samples, said DFT computation means computing a discrete Fourier transform for a given sub-frame of said set other than the first sub-frame of said set in a phase continuity relationship with a preceding sub-frame, said DFT computation means providing a phase offset for the given sub-frame to establish said phase continuity relationship with the preceding sub-frame;

processing means utilising said discrete Fourier transform coefficient for each sub-frame in said set to determine if a predetermined tone exists in said digital signal.

In a preferred embodiment, the tone detection apparatus performs a direct computation of the Discrete Fourier Transform (DFT) on short time sub-frames and then performs both a summing operation on complete frame and second DFT computation on segments. Both frames and segments are combinations of sub-frames. Preferably a frame is composed of two or three sub-frames while a segment is about seven sub-frames. Other size combinations are possible depending on the desired time and frequency resolution. Most preferably, the apparatus comprises:

An anti-aliasing low-pass filter to eliminate the spectral portion of the analog signal that is not in the range of interest.

An analog to digital (A/D) converter which samples the incoming signal at a rate at least equal to the Nyquist rate (8000 Hz for a telephone network) and converts it to a digital format such as PCM code.

A quadrature processing block that allows the system to substantially reduce the data stream with minimal loss of information as well as performs the first stage of spectral analysis. This processing block computes the DFT coefficients at candidate frequencies for each sub-frame of the signal.

A frame processing block which obtains magnitude information about the nominal frequencies of the incoming signal and produces a candidate tone. This is performed by summing the DFT coefficients of consecutive sub-frames computed by the quadrature-processing block.

A precision spectral processing block which obtains precise results regarding the frequency deviation of the signal with respect to nominal frequencies and permits stringent control over the accept/reject frequency bands of the receiver. This is achieved by computing a second level DFT on the basis of the first level DFTs computed by the quadrature-processing block.

A logical processing block that compares temporal characteristic of the signals with pre-determined values as well as determines based on results from the quadrature and precision spectral processing blocks, if a proper tone has been detected. This stage also permits to correctly identify tones where the two frequency components are slightly shifted in time.

A cadence processing block, part of the logical processing block, which analyses the results of the logical processing block over a slightly longer period of time (generally in terms of seconds instead of msec for the other stages). It allows determining if the correct cadence or time pattern has been detected. This block is present mainly when the tone detector is used for CPT tone detection and may be absent from certain designs without detracting from the spirit of the invention.

The tone detector may further comprise:

A buffer that accumulates the digitally sampled incoming signal into sub-frames that will be used in future processing.

A plurality of buffers, one for each analysed frequency, which accumulate the result of the first processing stage into another buffer representing a sequence of consecutive frames.

A lookup table that comprises the pre-computed sine and cosine values needed for the Discrete Fourier Transform (DFT) computation. This table is used in both the quadrature processing block and the precision spectral processing block.

In a most preferred embodiment, the tone detection apparatus operates as follows. The apparatus receives an analog signal from the system. The analog signal is first low passed filtered and then sampled in order to produce a digital signal. In the case of a telephone network application, the filtering is usually done at 4 kHz, since the frequencies of interest are in that range and therefore the sampling rate would be 8 kHz as directed by the Nyquist theorem. The digital samples are then stored in a buffer of size N that represents a sub-frame of the signal. The size of the sub-frame will determine the time resolution of the system. These samples are then transferred to the quadrature-processing block. There a DFT is computed on these sub-frames at each of the analysed candidate frequencies. A set of parameters, which are simply the values obtained by performing a DFT on a sub-frame, is generated. There is one parameter for each analysed frequency. In the case of MF signalling, six frequencies {700, 900, 1100, 1300, 1500, and 1700} must be analysed and, therefore, six parameters will be generated for each sub-frame. These parameters in turn are stored, each in a separate buffer. Once this analysis has been performed on a plurality of sub-frames and the resulting parameters have been stored in buffers, these computed values are processed by the frame processing stage and by the precision spectral processing stage.

The frame processing is executed for each of the analysed frequencies about a nominal value. The purpose of this stage is to evaluate the amplitude of the signal about the nominal frequencies and to possibly obtain a candidate tone. The analysis is done by computing for each nominal frequency the sum of the DFT coefficients of K consecutive sub-frames obtained from the quadrature-processing block where K is the number of sub-frames in a frame. Because the computations in the quadrature processing stage ensure phase continuity between consecutive sub-frames, computing the sum of the DFTs over K consecutive subframes is equivalent to computing the DFT over one frame directly from the time samples. The frame referred to in the previous sentence being composed of the same time samples as the K sub-frames. However, the computation of a sum is clearly simpler than that of a DFT and hence the DFT computed on the frame provide higher frequency resolution. The frames can also be made to overlap by including one or more of the last sub-frames composing the frame at the beginning of the following frame.

The next stage referred to as precision spectral processing is executed for each of the frequencies of the candidate tone (usually two) around a nominal value. The analysis is computed on segments that are preferably longer than frames usually composed of a few consecutive sub-frames. The purpose of this stage is to obtain power estimations for very narrow frequency bands and to determine if the frequency tolerance requirement was satisfied. Advantageously, an analysis is performed on (2L+1) local frequencies placed at regular intervals on both sides of a frequency that is closest to the nominal in a range determined by the frequency tolerance. The analysis is done by computing a weighted version of the DFT operation at each of the local frequencies and then applying magnitude and weighting operators. The weighting function is usually a time domain window such as a Hamming window centred about a frequency near the nominal. Energy values and the centre frequencies of the input signal are found at this stage which are then supplied to the logical processing stage which compares the values obtained at each of the analysed frequencies and determines if the specifications have been met for a given tone. In the affirmative, information about the tone received is sent to a controller station where the operation or connection is performed. In the event that some or all of the specifications have not been met, an error may be reported as in the case where more than two frequencies are above the energy threshold. Alternatively, the erroneous sequence may be ignored.

In a most preferred embodiment of this invention, the tone detection apparatus is integrated into a communication channel, such as one that could be used in a telephone network, that enables the accurate detection and decoding of Multi-Frequency (MF) tones. MF tones are mainly used to transmit calling and/or caller number information between telephone switches. An MF tone is detected if and only if two of the allowable frequencies are above a certain amplitude threshold and the durations are long enough to avoid any erroneous recognition. Each combination of two frequencies represents a pulse that in turn represents a digit. If more than two frequencies are present, as caused by a double key press, the receiver should report an error. Frequency and duration standards for MF are shown in tables 1 and 2.

TABLE 1

The table below shows the multi-frequency (MF) tone combinations for the various digits and control signals.

| f1/f2 Hz | 700 | 900 | 1100 | 1300 | 1500 | 1700 |
|---|---|---|---|---|---|---|
| 700 | X | 1 | 2 | 4 | 7 | ST3P |
| 900 | 1 | X | 3 | 5 | 8 | STP |
| 1100 | 2 | 3 | X | 6 | 9 | KP |
| 1300 | 4 | 5 | 6 | X | 0 | ST2P |
| 1500 | 7 | 8 | 9 | 0 | X | ST |
| 1700 | ST3P | STP | KP | ST2P | ST | X |

In a typical interaction a transmitter from a calling office initiates a tone sequence by sending a special tone, called the KP tone, and then proceeds by sending a series tones representing a digit sequence. Upon termination, the transmitter sends a ST tone to indicate the end of the tone sequence. The MF receiver monitors the communication channel for the KP tone. Until its reception, it ignores all signals on the channel. Once it receives the KP tone, it monitors the channel, performs an analog to digital conversion of the signal and proceeds in the spectral and temporal analysis of the signal. The spectral analysis is performed by computing the straight DFT at the six frequencies of interest {700, 900, 1100, 1300, 1500, and 1700} over a short time sub-frame. Following this, the frame processing computes the sum of the DFT coefficients over a frame (typically two or three sub-frames) and a second DFT is performed on the results of the first DFT over a segment. This allows a very high time resolution due to the short time window of the first DFT and a high frequency resolution due to the longer time window resulting from the concatenation of many sub-frames in the second DFT. Following this computation, the results of the quadrature processing stage, the precision spectral processing stage and the frame processing stage are sent to the logical processing block which evaluates if some predetermined amplitude criteria have been met and if the temporal requirement have been attained. If a valid tone is detected, the corresponding digit is sent to a controller that performs a predetermined operation such as connection or billing. Once the receiver decodes the ST tone, it stops monitoring the communication channel for digit tone and monitors for the KP tone once again.

In another specific embodiment of this invention, the tone detection apparatus is integrated into a communication channel, such as one that could be used in a telephone network, that enables the accurate detection and decoding of Dual Tone Multi-Frequency (DTMF) tones. DTMF are mainly used for communications between the user and the system and can also be used to transfer information between telephone switches. As a concrete example of DTMF signalling, customers dialling into a service provider and requesting information may confirm what is understood by pressing the numbers on a touch tone pad. DTMF tones are

TABLE 2

Specifications for tone receivers describe a variety of criteria that the receiver must conform to. Tolerances are generally specified with an "accept band", within which the tone must be accepted, and a "reject band" in which the tone must be rejected. Often there is a gap between these two bands in which the tone may or may not be accepted. The table below shows the tolerance of the MF system as directed by the BellCore specification "BOC Notes on the LEC Networks SR-TSV-002275":

|  | Accept | Reject |
|---|---|---|
| Frequency Tolerance | +1.5% + 5 Hz, −1.5% − 5 Hz | ±3.5% |
| Amplitude Level | 0 to −25 dBm0 per frequency | ≦35 dBm0 per frequency |
| Amplitude Twist | ±6.0 dB. Desirable to accept greater twist | Not specified |
| SNR Gaussian noise | ≧20 dB | N/A |
| Impulse noise | ≧−12 dB | N/A |
| Tone duration a) of each frequency component | All except KP: ≧30 ms KP: ≧55 ms | All except KP <10 ms (desirable) KP: <30 ms |
| Tone Duration b) Coincidence (overlap) | ≧26 ms (i.e. the two component may be shifted by 4 ms) | 10 ms |
| Inter-digit duration | ≧25 ms | Bridge interruptions at least up to 10 ms but not exceeding 25 ms after the minimum duration signal 30 ms has been received | similar to MF tone in the sense that they are composed of two and only two frequencies. However, DTMF tones consist of one frequency from a low group and one frequency from high group and have 16 distinct combinations. The table 3 and 4 show the frequency and time specification for DTMF tones. The spectral processing of a DTMF tone is similar to the MF except that the frequencies analysed are different and that there are no KP/ST tones.

TABLE 3

The table below shows the dual tone multi-frequency (DTMF) tone combinations for the various digits and control signals.

|  |  | High Group Frequencies (Hz) | | | |
|---|---|---|---|---|---|
|  |  | 1209 | 1336 | 1477 | 1633 |
| Low | 697 | 1 | 2 | 3 | A |
| Group Frequencies | 770 | 4 | 5 | 6 | B |
| (Hz) | 852 | 7 | 8 | 9 | C |
|  | 941 | * | 0 | # | D |

TABLE 4

Tolerances are generally specified with an "accept band" within which the tone must be accepted and a "reject band" in which the tone must be rejected. Often there is a gap between these two bands in which the tone may or may not be accepted. The table below shows the tolerance of the DTMF system as directed by the BellCore specification:

| | Accept | Reject |
|---|---|---|
| Frequency Tolerance | ±1.5% | ±3.5% |
| Amplitude Level | 0 to −36 dBm0 per frequency | <55 dBm0 per frequency |
| Amplitude Twist | if high frequency tone is 4.0/−8.0 dB relative to the low frequency tone | Not specified |
| SNR Gaussian noise | ≧20 dB each frequency component must satisfy SNR ≧16 dB | N/A |
| Impulse noise | ≧−12 dB | N/A |
| Tone duration | ≧40 ms | <23 ms |
| Inter-digit duration | ≧40 ms | No rejection bridging specified |

In another specific embodiment of this invention, the tone detection apparatus is integrated into a communication channel, such as one that could be used in a telephone network, that enables the accurate detection and decoding of Call Progress Tones (CPT). Call progress tones, also called audible tones, are used to inform users and operators of the system about the progress or disposition of the telephone call they are attempting. CPT tones include the dial tone, audible ring, line busy, reorder, special service information tones (SIT), recall dial tone and many others represented as Multi-frequency signals having a complex cadence. Traditionally, standards governing the CPT tone have been very lax. Typically, we differentiate CPT tone more on the basis of their cadence than on stringent frequency and time accept/reject rules in contrast to the case for MF and DTMF tones where precise specifications are given. Tables 5 and 6 show the frequency and timing characteristics of the common CPT tones. The spectral processing of this type of signal is similar to that of the MF and DTMF signals except for the frequencies analysed and the absence of the KP/ST tones. The temporal processing however involves evaluating over a longer time period the cadence of the signal with respect to some predefined cadence.

TABLE 5

Call progress tone (CPT) are defined by the following frequency matrix:

| f1/f2 Hz | 0 | 440 | 480 | 620 |
|---|---|---|---|---|
| 350 |  | Dial Tone/Stutter | | |
|  |  | Dial Tone | | |
| 440 | Call Waiting/ Variations | | | Ringing |
| 480 |  | | | Busy/Reorder |

TABLE 6

The table below illustrates the frequency and timing behaviours of common CPT tones. Note that Dial, Ring, Busy and Reorder are dual-tones (i.e. 2 frequencies) while the SIT is a concatenation of three mono-tones (i.e. 1 frequency)

| Tone Type | Freq. Components (Hz) | Timing Information |
|---|---|---|
| Dial | 350.0 + 440.0 | Steady |
| Ring | 440.0 + 480.0 | Cadence of 2.0s ON, 4.0s OFF |
| Busy | 480.0 + 620.0 | Cadence of 0.5s ON, 0.5s OFF |
| Reorder | 480.0 + 620.0 | Cadence of 0.25s ON, 0.25s OFF |
| SIT | 913.8, 1370.6, 1776.7 | 274 ms, 274 ms, 380 ms |

As embodied and broadly described herein the invention also provides an improvement to a tone detection apparatus that comprises:
an input for receiving a digital signal potentially containing a tone detectable by said apparatus;
first level DFT computation means for processing the digital signal to compute a plurality of discrete Fourier transform coefficients associated to a candidate frequency, each discrete Fourier transform coefficient being associated to a respective sub-frame in a set of successive sub-frames of the digital signal;

second level DFT computation means for computing at least one discrete Fourier transform coefficient associated to the set of successive sub-frames on the basis of the plurality of discrete Fourier transform coefficients computed by said first level DFT computation means.

As embodied and broadly described herein the invention also provides a method for detecting tones in a digital signal, said method comprising the steps of:

receiving a digital signal potentially containing a tone detectable by said apparatus;

computing a discrete Fourier transform coefficient for at least one candidate frequency for each sub-frame in a set of successive sub-frames of the digital signal, each sub-frame containing a plurality of signal samples, the computation of a discrete Fourier transform for a given sub-frame of said set other than the first sub-frame of said set being effected in a phase continuity relationship with a preceding sub-frame, the computation of a discrete Fourier transform for the given sub-frame including providing a phase offset to establish said phase continuity relationship with the preceding sub-frame;

utilising said discrete Fourier transform coefficient for each sub-frame in said set to determine if a predetermined tone exists in said digital signal.

As embodied and broadly described herein the invention also provides an improvement to a method for detecting tones in a digital signal, the improvement comprising the steps of:

a) receiving a digital signal potentially containing a tone;

b) processing the digital signal to compute a plurality of discrete Fourier transform coefficients associated to a candidate frequency, each discrete Fourier transform coefficient being associated to a respective sub-frame in a set of successive sub-frames of the digital signal;

c) computing at least one discrete Fourier transform coefficient associated to the set of successive sub-frames on the basis of the plurality of discrete Fourier transform coefficients computed at step b).

As embodied and broadly described herein the invention also provides a tone detection apparatus, said apparatus comprising:

an input for receiving a digital signal potentially containing a tone detectable by said apparatus;

energy determination means for assessing a cumulative energy value indicative of a total energy in said digital signal over a certain time period at a plurality of predetermined frequencies in said digital signal, each one of said predetermined frequencies corresponding to a given tone;

processing means operative if said cumulative energy value exceeds a threshold to determine at which frequency of said plurality of frequencies a tone is present.

In a most preferred embodiment, the tone detection apparatus as defined above in broad terms features a dual-stage process for detecting the presence of tones in the signal. The first stage of the process is designed to detect if a tone is likely to exist in the signal. If the likelihood of a tone presence is significant, the second stage is invoked that performs a more detailed analysis of the signal to identify which tone is present and whether this tone is within an acceptable frequency tolerance range. During the first stage the energy of the signal is computed over a plurality of signal sub-frames in the frequency bands of interest, each frequency band corresponding to a given tone. For each sub-frame this involves computing a DFT coefficient for each frequency band. The DFT coefficients are computed in a phase-continuous fashion from one sub-frame to another, thus enabling to estimate the energy in the frequency bands of interest over a full frame (made up by a number of sub-frames) by simply adding the DFT coefficients for the different sub-frames. This addition allows obtaining a value indicative of the combined energy in the frequency bands of interest over a period of time corresponding to the duration of the frame. If the combined energy exceeds a certain threshold, that means that a tone is likely to exist in the signal, then the second, detailed analysis stage is effected. During that second stage analysis, the frequency band where a high energy level is present is identified to determine which tone is present, and also a frequency tolerance test is performed to determine if the frequency of the existing tone is within a certain acceptance range.

As embodied and broadly described herein, the invention also provides a method for detecting tones in a digital signal, said method comprising the steps of:

receiving a digital signal potentially containing a tone detectable by said apparatus;

assessing a cumulative energy value indicative of a total energy in said digital signal over a certain time period at a plurality of predetermined frequencies in said digital signal, each one of said predetermined frequencies corresponding to a given tone;

determining at which frequency of said plurality of frequencies a tone is present when said cumulative energy value exceeds a threshold.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appended claims.

FIG. 7 shows a state diagram for the logical processing of an MF signal.

DESCRIPTION OF A PREFERRED EMBODIMENT

Figure 1:
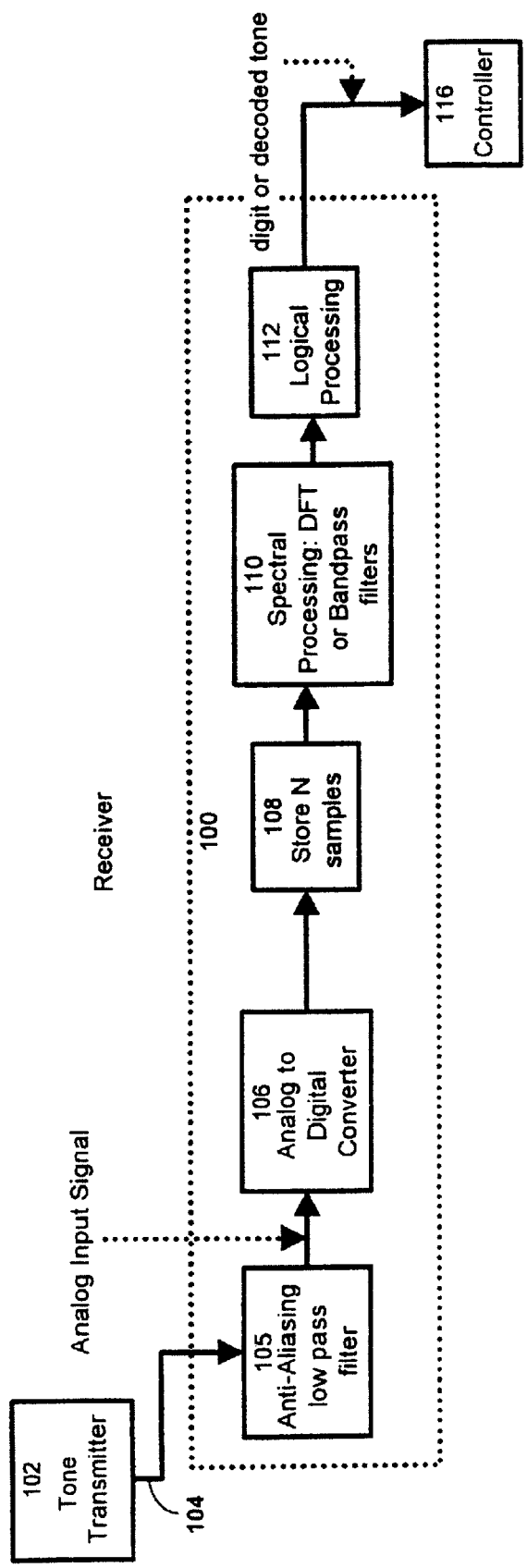
FIG. 1 shows a high-level block diagram of a prior art tone receiver used in the context of Multi-Frequency (MF) or Dual Tone Multi-Frequency tones.
Figure 2:
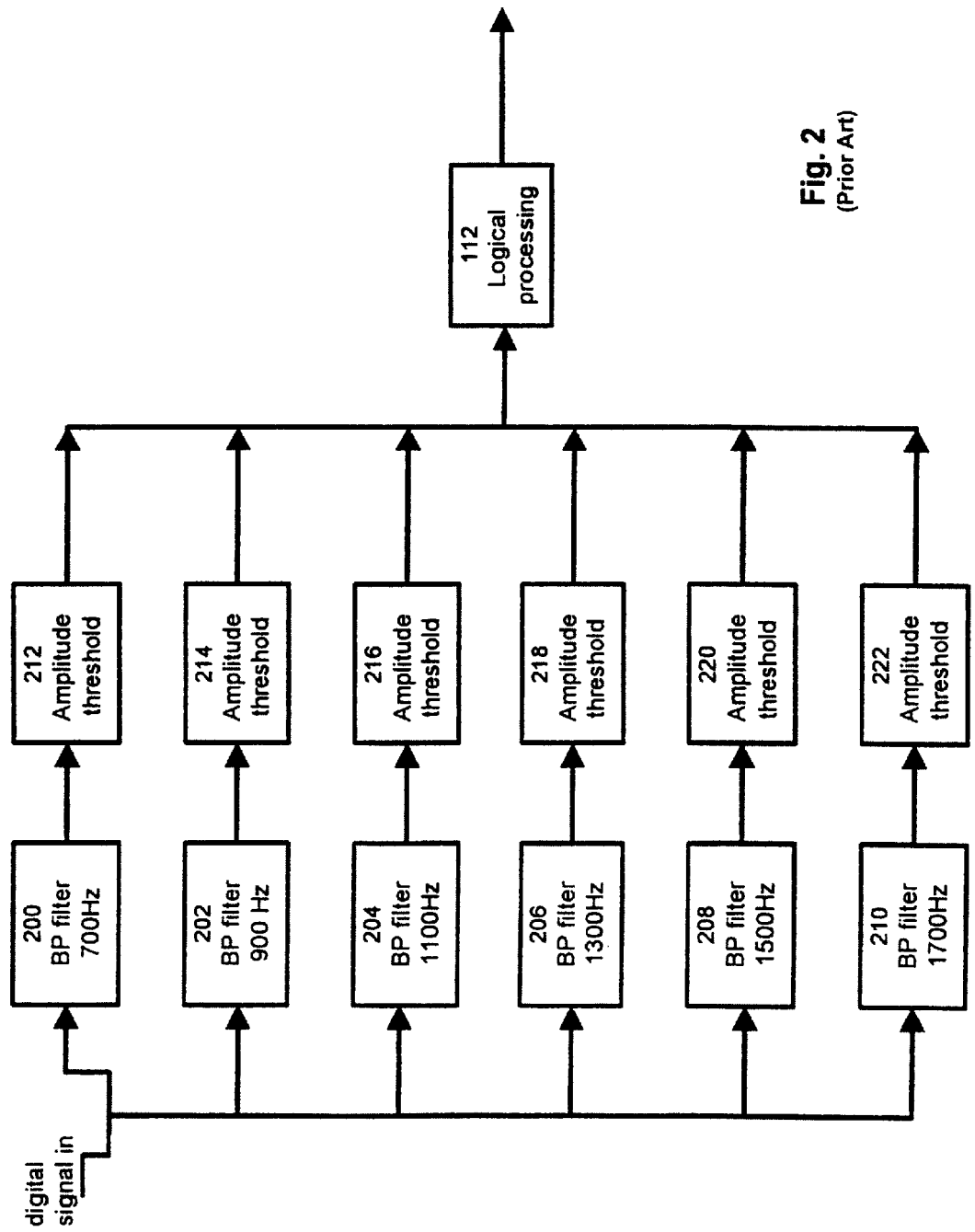
FIG. 2 shows an example of a prior art spectral processing unit that uses bandpass filters to analyse the incoming signal. This system is applicable to MF detection.

For the purpose of this specification the expression "accumulator" is used to designate a device used to sum numbers by adding its current content to an input value and then replacing its current value by the newly computed one. In mathematical terms to perform the operation x=x+y.

For the purpose of this specification the expression "complex accumulator" designates an accumulator where the arguments are of the form "a+ib" and where a and b are real numbers and $i=\sqrt{-1}$. Furthermore this device preferably stores the real and imaginary parts of the result separately.

For the purpose of this specification the expression "complex multiplication" designates a multiplication where the arguments are of the form "a+ib" and where a and b are real numbers and $i=\sqrt{-1}$. Furthermore a device implementing this operation preferably stores the real and imaginary parts of the result separately.

The present inventors have made the unexpected discovery that by performing a first DFT on a short time window (sub-frame) followed by a sum on a larger window (frame) and a second DFT block on yet another larger window (segment), both high time and frequency resolution can be obtained while requiring a minimal amounts of computation. A tone detection apparatus implementing this inventive principle can be adapted to various signalling codes by simply modifying a pre-determined set of parameters. The result is a robust, highly efficient tone detection system that can be easily adapted to recognise current and future signalling convention by simply changing the necessary parameters.

The use of the first DFT block with short time duration sub-frames enables to obtain a high temporal resolution for the signal. As a specific example, suppose the signal is sampled at a rate of 8000 Hz and that the time window in 20 samples this permits a time resolution of:

$$\frac{20 \text{samples/subframe}}{8000 \text{samples/sec}} = 2.5 \text{ms/subframe}$$

On the other hand the spectral resolution is poor being only 400 Hz in the example above. Hence, this stage allows a precise control over the tone duration evaluation.

The use of the frame-processing block with a duration of a frame (typically 2 to 4 sub-frames) enables to obtain a slightly better frequency resolution of the signal. This stage supplies the logical processing stage with amplitude and duration information sufficient to verify the presence of a candidate tone. This stage is a compromise between time and frequency resolution and is commonly the only one present in prior art systems.

The second DFT, obtained by using results computed in the first DFT on a complete segment, preferably comprising about seven sub-frames, enables us to obtain high spectral accuracy. Ensuring the first DFT is phase continuous allows using the result directly in the second DFT without requiring a return to the time domain signal. Taking the example described above and assuming that a frame is composed of 7 sub-frames, the frequency resolution becomes ~57 Hz. This stage allows a precise control of the frequency acceptance and rejection bands. By changing the nominal frequencies where each of these two blocks computes the DFT, this configuration can be adapted to suit nearly any signal.

Figure 3:
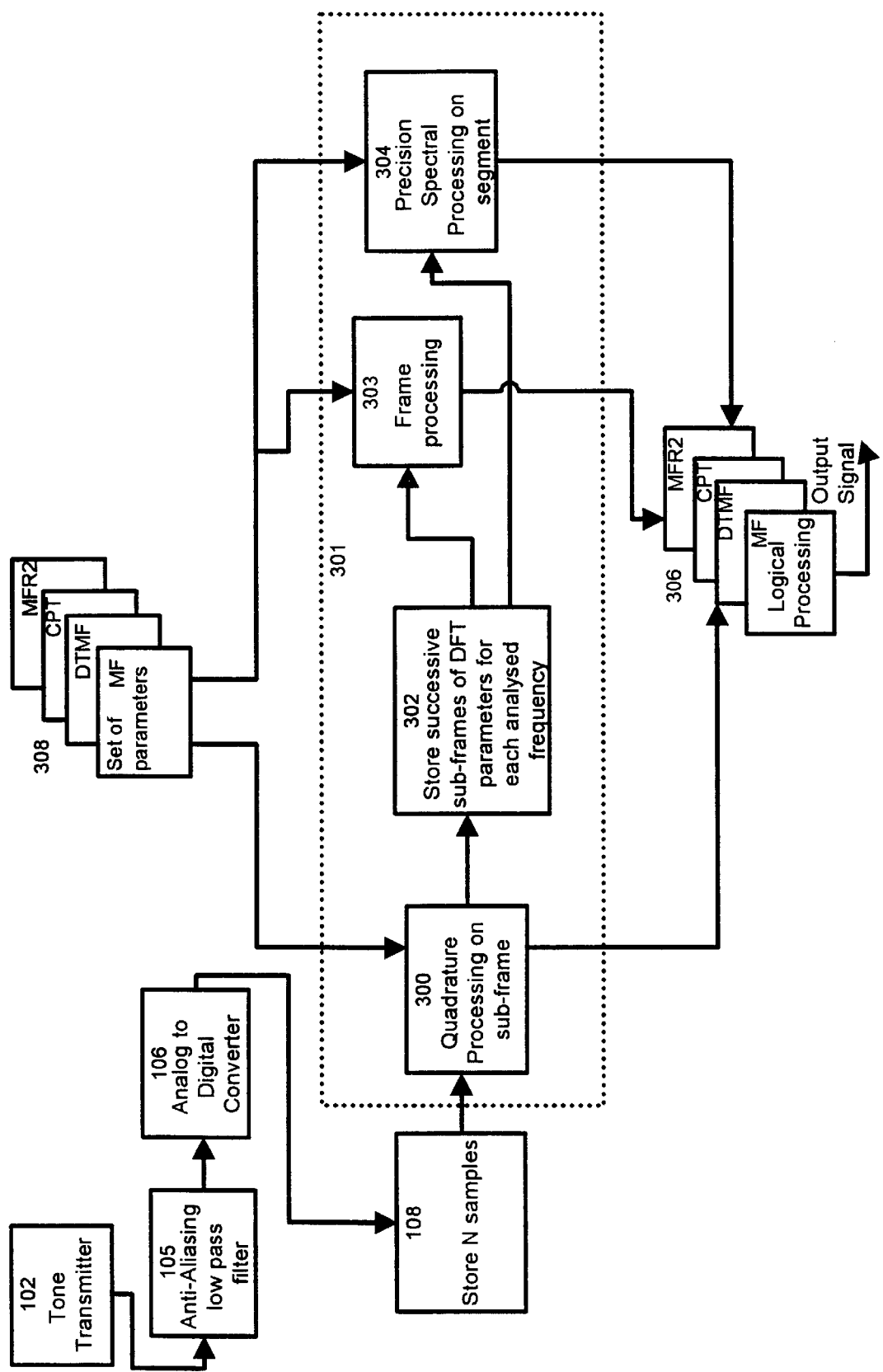
FIG. 3 shows a high-level block diagram of a preferred embodiment of the tone detection apparatus constructed in accordance with the present invention.

In a most preferred embodiment of the present invention, the tone detection apparatus receives an analog signal that is then processed by a four-step operation shown in FIG. 3.

Anti-Aliasing Low-pass Filter

The first step, usually referred to as the anti-aliasing low-pass filter 105, is used to eliminate frequencies outside the range of interest thereby eliminating or reducing the effect of aliasing when the continuous signal is converted to digital format. By the Nyquist theorem, the cut-off frequency of the filter should be half that of the sampling frequency. In the case of a telephone network application, the cut-off is generally about 4000 Hz. This operation is very well known in the art of signal processing and as a reference the reader may choose to consult "Discrete-Time Processing of Speech Signals" by Deller, Proakis and Hansen, Macmillan Publishing Company New York 1993 whose content is hereby incorporated by reference.

Analog to Digital Converter

The second step, usually referred to as the analog to digital converter 106, consists of sampling the incoming analog signal to produce a digital version of it. Sampling is usually performed at a rate at least equal to the Nyquist rate such as to avoid the possibility of aliasing. In the context of a telephone network this rate is 8000 samples/second. Typical digital representations that could be used in the context of a receiver include Pulse Code Modulated signals (PCM), differential PCM (DPCM) and Adaptive Delta Modulation (ADM). Many coding schemes exist and are used for various reasons such as efficiency, compactness, simplicity and others. The most preferred embodiment of this invention uses the PCM coding scheme. The analog to digital conversion process is well known in the art of signal processing and telecommunications. Note here that in the case the input signal is digital, this A/D converter 106 and the low-pass filter 105 are not required. Further information on PCM and other coding techniques can be obtained on this topic in "Discrete-Time Processing of Speech Signals" by Deller, Proakis and Hansen, Macmillan Publishing Company New York 1993 whose content is hereby incorporated by reference. The digital samples obtained from the A/D converter 106 are then stored into sub-frames 108. Once a predetermined number of samples have been collected, these samples are passed on to the next stage. The number of samples N in the storage buffer depends on the frequency and time resolution desired by the system. Since at this stage we are mainly concerned with high time resolution, short time windows are used. In an embodiment of this invention used for MF detection, we use sub-frames of 20 samples, which gives us a time resolution of 2.5 ms at the sampling rate of 8000 Hz.

Spectral Processing

The third step, called spectral processing 301, comprises three functional blocks 300 303 304, a frame storage unit 302 and a set of parameters 308. The three functional blocks, namely the quadrature processing block 300, the frame processing block 303 and the precision spectral processing block 304, do not depend on signal sequences, which means that they do not depend on the temporal characteristics of the signal. Therefore, for the different classes of signals (MF, DTMF, MF-R2, and CPT) the only differences in the spectral processing step are the parameters 308 such as the nominal frequencies and the levels of tolerance that may be supplied for each different signal class.

The quadrature-processing block 300 performs the preliminary filtration of the signal by performing a DFT computation at each frequency of interest on a sub-frame of the digital signal. It consists of $N_f$ structurally identical DFT channels where $N_f$ is equal to the number of analysed frequencies. For MF signalling $N_f$ would be equal to 6 since the six frequencies {700, 900, 1100, 1300, 1500, 1700} must be analysed. This stage achieves the high time resolution required for accurate tone detection. The spectral analysis is performed on the digital samples stored in the buffer 108 and the DFT coefficients are obtained at this stage. The DFT is well known in the art of signal processing and basic principles can be found in "Discrete-Time Signal Processing" by Oppenheim and Shafer, Prentice Hall series, 1989 whose content is hereby incorporated by reference. The DFT coefficients are computed by using the following equation:

$$\xi_k(r) = \sum_{i=rN}^{rN+N-1} x_i \exp\{j2\pi f_k iT + \Phi_k\} \quad (1)$$

for $i = rN$ to $rN + N - 1$ i.e. over one sub-frame $j = sqrt(-1)$

In the above equation: $x_i$ designate the PCM sample at time i; r is the sub-frame number; k is the index of the frequency analysed; $f_k$ is the frequency analysed; T is the reciprocal of the sampling rate and $\phi_k$ is the starting phase of the current sub-frame. The phase component $\phi_k$ is used at this stage in order to permit phase continuity between sub-frames and allow parameters computed using sub-frames to be combined without requiring the re-computations of the DFT. In a specific example, when computing the DFT coefficients for a given sub-frame, the variable $\phi_k$ for use in the above formula is set to the value of the final phase of the previous sub-frame. This feature enables to provide phase continuity between the sub-frames.

Figure 4:
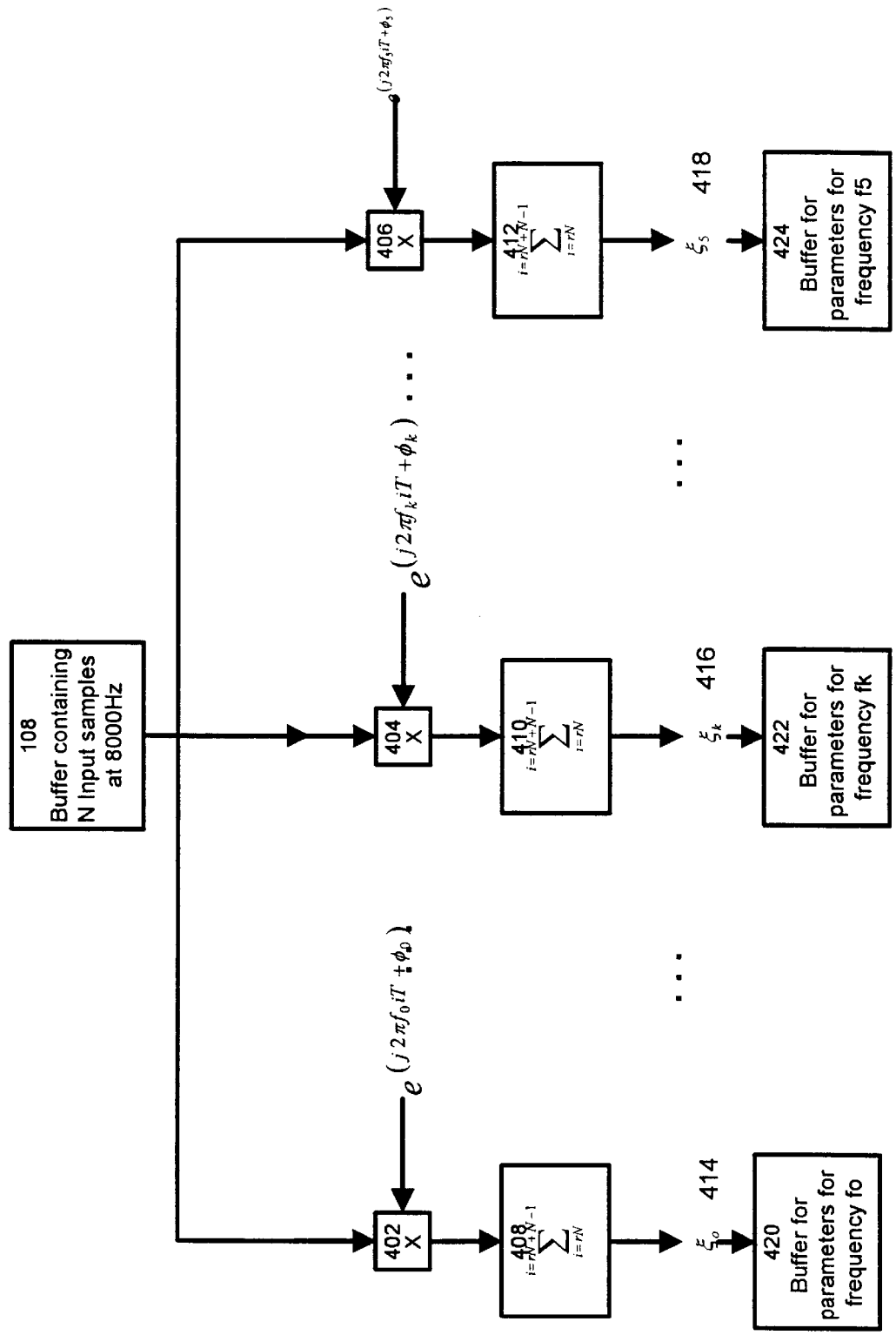
FIG. 4 shows a detailed block diagram of the quadrature-processing block of the tone detection apparatus of FIG. 3.

A specific example of a device to carry out the DFT computation is depicted in FIG. 4. The device comprises:

Complex multipliers 402 404 406, one for each of the analysed frequencies. For example, in the case of MF signalling, six such multipliers would be required.

Complex accumulators 408 410 412, one for each of the analyzed frequencies. In FIG. 4, these blocks 408 410 412 indicate that the results of the multiplications 402 404 406 are summed over one sub-frame.

Following this, the computed values 414 416 418 are stored each in a separate buffer 420 422 424 where they are stored until a full frame is computed. Note that the illustration in FIG. 4 shows only 3 channels for the sake of simplicity. In the case of a receiver detecting MF, DTMF, CPT or any other signalling, the number of channels would be equal to the number of frequencies being analysed. For example, in the case of MF signalling 6 channels will be required to analyse the six possible frequencies.

The computation of the complex multiplications 402 404 406 requires a more detailed explanation. In order to speed up the computations and hence favour the real-time characteristic of the invention, a look-up table is used to reduce the computational load by pre-computing a set of values and storing them in a permanent or temporary computer readable medium. This reduces the complicated computation of an exponential into the computation of addresses in a look-up table. Furthermore, in order to satisfy the phase continuity criteria of the DFT computation for this invention, care must be taken to properly set the phases $\phi_k$ in the exponential values in order to achieve this goal. This is done continuing the initial phase of a sub-frame DFT computation from the final phase of the previous sub-frame DFT computation.

Figure 4A:
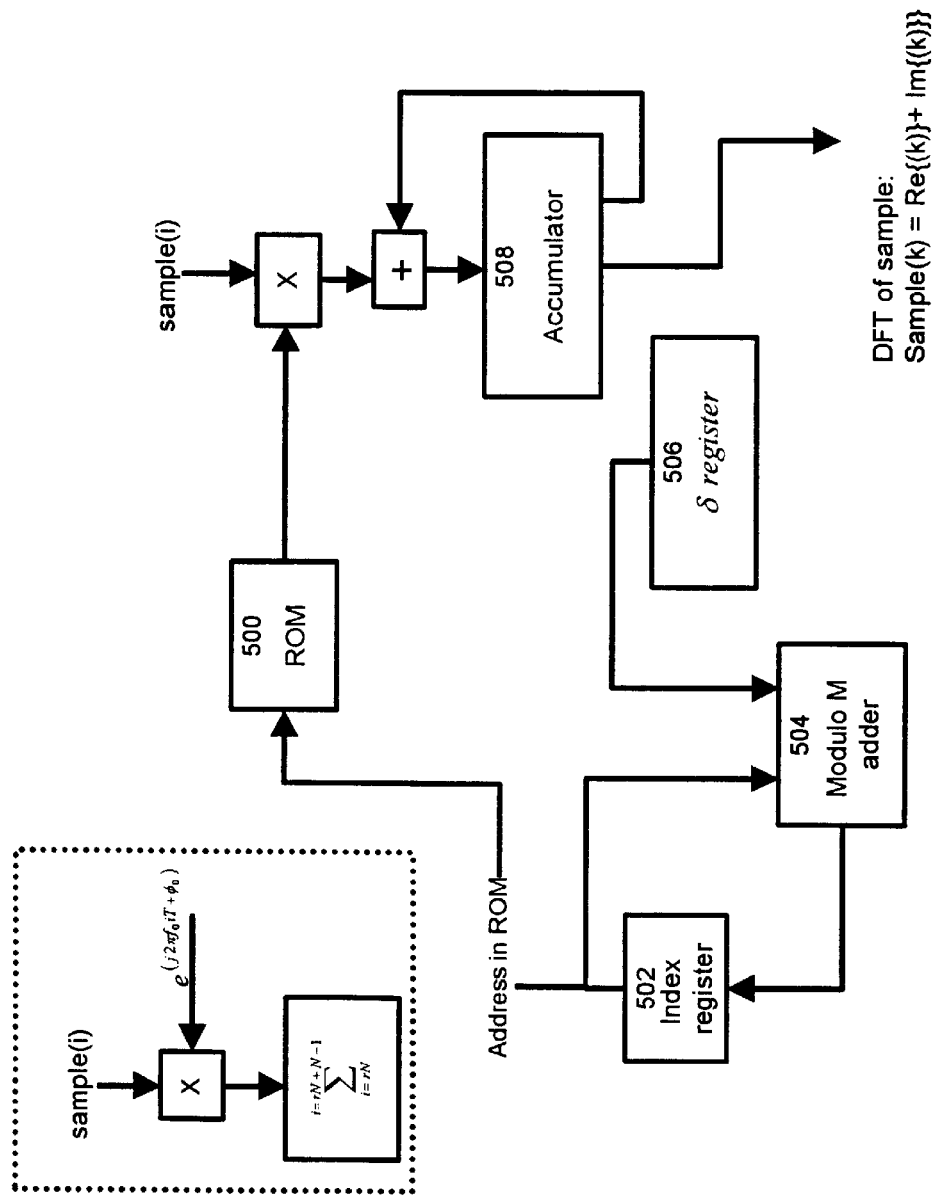
FIG. 4a shows a block diagram of the processing block, for computing exponential values using a lookup table of the apparatus, in accordance with the invention.

FIG. 4a shows this computation, as it would be performed in a preferred embodiment of this invention. This modules comprises:

A read-only-memory (ROM) unit 500 where the lookup table of previously computed values is stored.

An index register 502 used to store the last address in the lookup table of the frequency analyzed. In order to provide phase continuity, both the real and imaginary part of the computation are stored and updated separately.

A modulo M adder 504 used to compute the address in the lookup table.

A $\delta$ register 506 used to contain the step size for each of the frequencies analyzed.

An accumulator 508 used to sum intermediate results until a complete sub-frame as been analyzed.

The principles of this computation are basic in complex variable mathematics and in basic signal processing theory where an exponential can be expressed as a complex combination of Sine and Cosine waves. In mathematical terms:

$$e^{j\Phi} = \cos(\Phi) + j\sin(\Phi) \quad (2)$$

In the preferred embodiment of the invention, the sine values are stored in a lookup table 500 of size M which represents 360 degree, or one period of a sine wave, and which allows a frequency resolution of $f_s/M$ in the case where the sampling frequency in $f_s$ Hz. The cosine values are not stored in this table since they can be extracted from the sine value by shifting the angle by 90 degrees or, alternatively by shifting the indices in the lookup table by M/4. Therefore, with the above description in mind, equation 1 may be rewritten as:

$$\xi_k(r) = \sum_{i=rN}^{rN+N-1} x_i S[\{i\delta(k) + IndexCosine(k)\} \bmod M] + j \sum_{i=rN}^{rN+N-1} x_i S[\{i\delta(k) + IndexSine(k)\} \bmod M] \quad (3)$$

where $S(m) = \sin(2\pi m/M)$ m=0 ..., M-1 i.e. m is the index of the lookup table r is the subframe number N is the size of the subframe $\delta(k)$ is the address step in the table for the k'th frequency analysed indexCosine(k) is the last address pointer to the lookup table of the previous frequency in the previous buffer for the real part of equation 3 indexSine(k) is the last address pointer to the lookup table of the previous frequency in the previous buffer for the imaginary part of equation 3 (4)

The step size $\delta(k)$ is computed by dividing the analyzed frequency by the frequency resolution. As a concrete example, let us consider MF tones where the nominal frequencies are located at {700, 900, 1100, 1300, 1500, and 1700}. If the sampling rate is 8000 Hz and using a lookup table of 80 entries, the frequency resolution is 100 Hz and the following values of $\delta(k)$ would be obtained {7, 9, 11, 13, 15, 17} each value corresponding to a specific nominal frequency.

Figure 5:
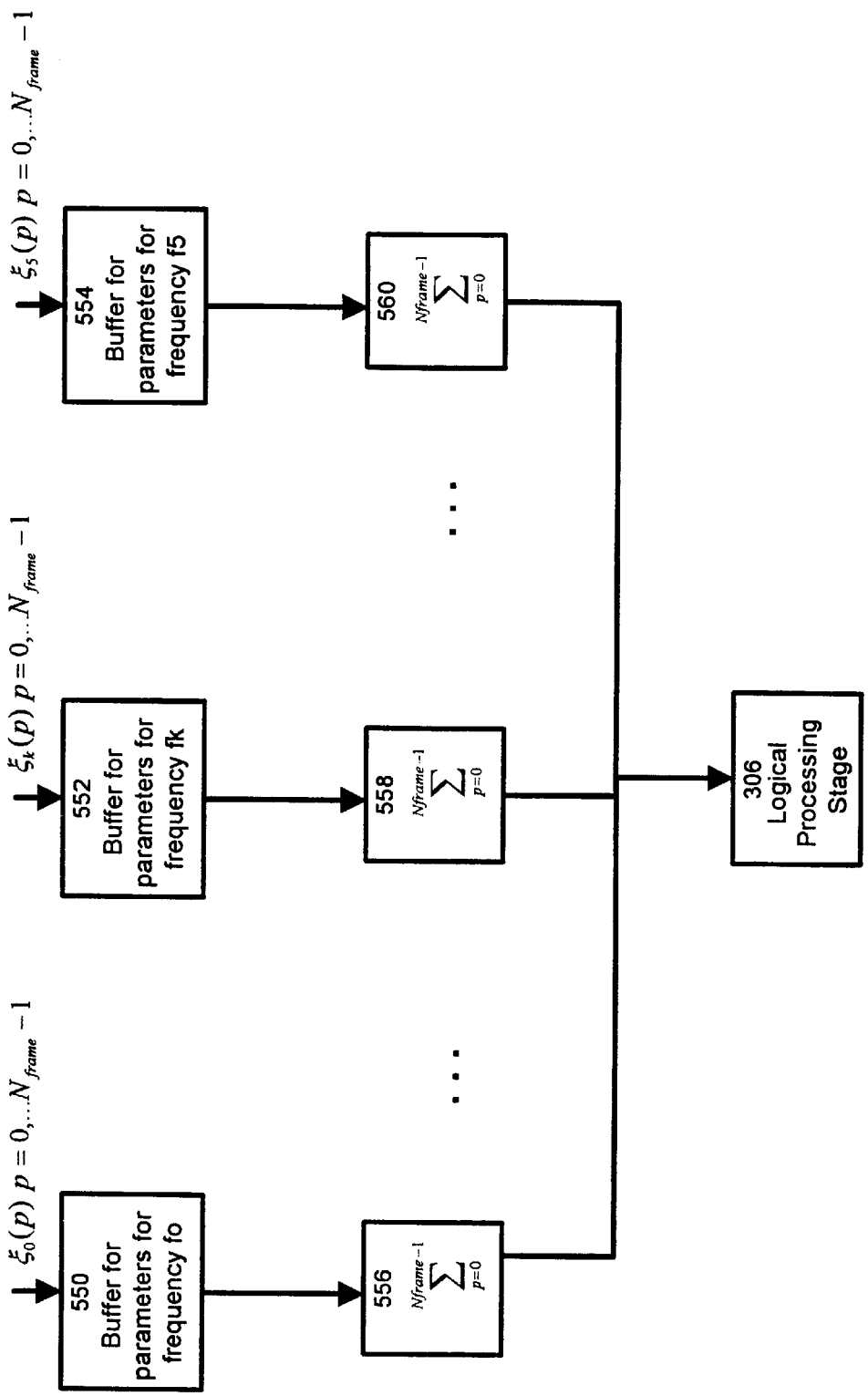
FIG. 5 shows a detailed block diagram of the preferred embodiment of the frame-processing block of the apparatus constructed in accordance with the invention.

The indexcosine(k) and indexSine(k) values shown in the previous equations are computed recursively to reflect the current phase of the computation. As illustrated in FIG. 5, the following computation involving the modulo M adder 504 and the index register 502 is performed:

IndexCosine(k)=[IndexCosine(k)+δ(k)]modM

IndexSine(k)=[IndexSine(k)+δ(k)]modM

Where IndexCosine(k) is initialized to M/4 to reflect the 90-degree phase shift of the cosine computation and IndexSine(k) is initialized to 0.

The organization described above guarantees continuous phase by using modulo M addressing in the look-up table and by storing real and imaginary part of the result separately. The organisation of the lookup table may vary greatly between different implementations and manners different from the one presented here do not detract from the spirit of the invention as long as the addressing in the look-up table is such that is guarantees continuous phase. Continuity of phase allows the combination of the parameters computed in the sub-frames to be combined in later processing.

The following block in the spectral analysis stage is the frame-processing block 303. The purpose of this stage is to obtain an indication that there is a candidate tone in a certain frame by performing the analysis using a window size that represents a compromise between time and frequency resolution. The DFT parameters (ξ) computed in the quadrature stage are stored in $N_f$ buffers for the duration of one frame where $N_f$ is the number of frequencies analysed. In the preferred embodiment of this invention, the size of the frame is two sub-frames however larger frames could be used to increase the frequency resolution of the system without detracting from its spirit. In simple terms the frame-processing block consists of summing for each nominal frequency the DFT coefficients of successive sub-frames obtained in the quadrature processing stage in order to obtain the DFT coefficients for a complete frame. This summation is possible because the DFT coefficient have been computed such as to be have phase continuity between sub-frames. For each frequency the following computation is performed:

$$\sum_{p=0}^{Nframe-1} \xi_k(p) \quad (5)$$

where p is the sub-frame index in the frame, $\xi_k$ is the DFT coefficient computed by the quadrature processing stage 300 for the Kth nominal frequency and Nframe is the number of sub-frames in a frame. The general scheme of the frame-processing block is shown in detail in FIG. 5. In the preferred embodiment of this invention this block comprises:

Complex accumulators 556 558 560, one for each of the nominal frequencies being evaluated.

As a variant, the frames can also be made to overlap by including one or more of the last sub-frames composing the frame at the beginning of the following frame. This allows high temporal resolution at the frame processing stage at very little additional cost (summation of sub-frames). Prior art systems would require costly computations to be re-performed on the source samples to achieve the equivalent.

Figure 6:
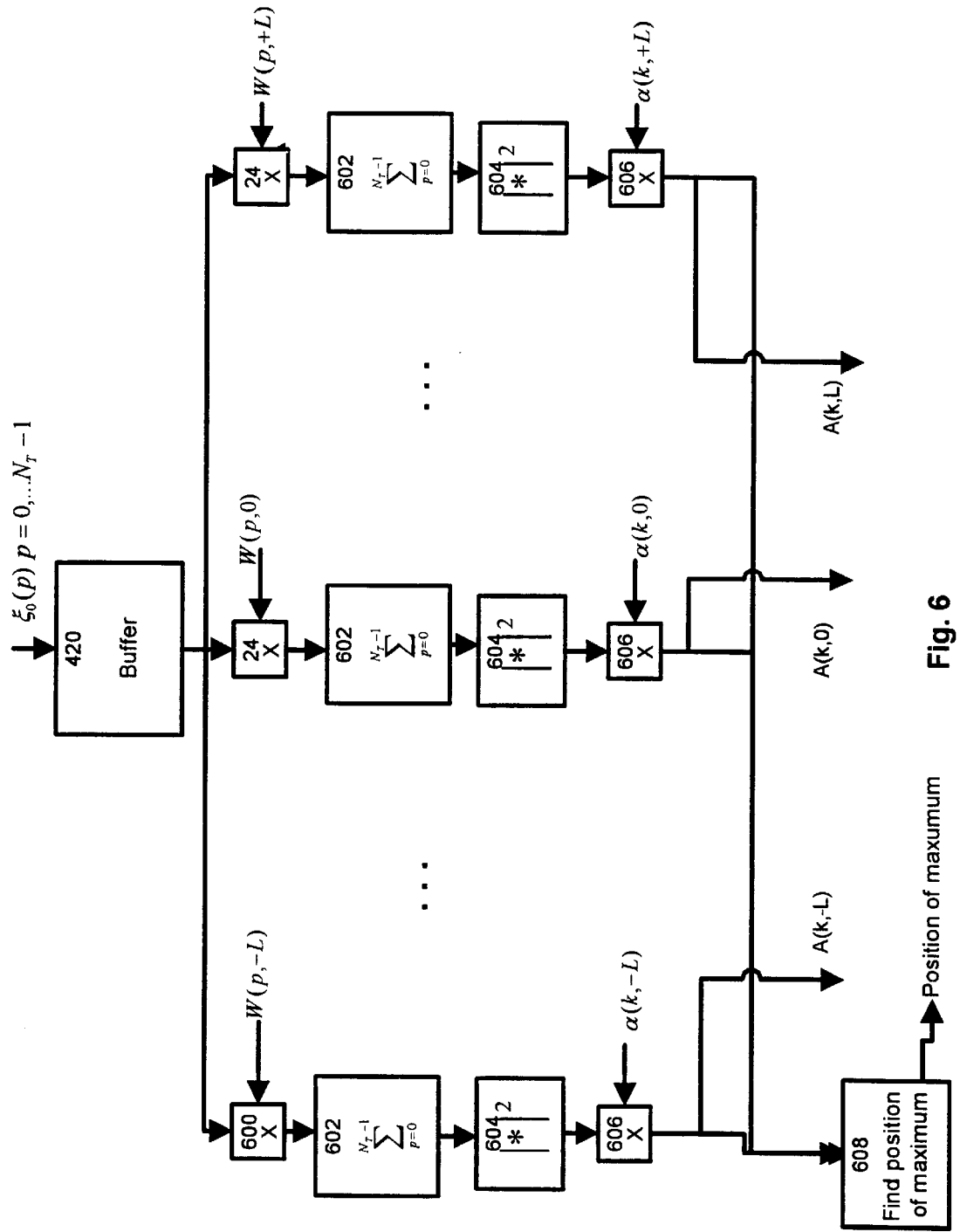
FIG. 6 shows a detailed diagram of the preferred embodiment of the spectral processing block of the apparatus constructed in accordance with the invention.

Another block in the spectral analysis is the precision spectral processing stage 304. The purpose of this stage is to achieve high frequency resolution in order to provide precise control of the accept/reject bands. The DFT parameters (ξ) computed in the quadrature stage are stored in $N_f$ buffers for the duration of one segment where $N_f$ is the number of frequencies analysed. In the preferred embodiment of this invention, the size of the segment is seven sub-frames however shorter or larger segments could be used to increase the frequency resolution of the system without detracting from its spirit. The principle requirement for the size of the segment is that the frequency resolution obtained by the combination of these sub-frames into segments allows orthogonality within the frequency bands. By maintaining phase continuity in the sub-frame DFTs we can perform more precise and more robust processing than the traditional approaches without a major cost in computation. The general scheme of the precision spectral processing block is shown in detail for one analysed frequency in FIG. 6. In the preferred embodiment of this invention this block comprises:

Complex multipliers 600, one for each of the local 2L+1 frequencies near the nominal frequency being evaluated.

Complex accumulators 602, one for each of the local 2L+1 frequencies near the nominal frequency being evaluated.

Magnitude square evaluators 604, one for each of the local 2L+1 frequencies near the nominal frequency being evaluated.

Real multipliers 606, one for each of the local 2L+1 frequencies near the nominal frequency being evaluated.

A device such as a multiplexor 608 used to select the position of maximum amplitude amongst 2L+1 entries.

The precision spectral processing block computes DFTs based on the results of the DFT produced by the quadrature block. It computes these DFTs at evenly spaced 2L+1 frequencies about the frequency of interest and uses complex weights to define local frequencies and frequency resolution. In the preferred embodiment of this invention, a value of L=2 has been found to yield satisfactory results and hence a DFT is computed at 5 local frequencies. A Hamming window in the time domain has been used in this invention to given different weights to certain frequencies. However, other windows such as the Bartlett window or no window at all may be used without detracting from the spirit of the invention. It must, however, be noted that not using a weight window will reduce the frequency accuracy of the system by not giving preference to any particular frequency in the acceptance band so a window weighing preferentially frequencies near that of interest is recommended. Mathematically, the operation performed can be expressed as follows:

F(k,l)=f(k,l)−f(k)

$w_l(p)=w(p) \exp\{j2\pi F(k,l)pT_m\}$ where w(p) is a Hamming window p is the sub-frame index in a segment $T_m$ is the duration of a sub-frame (2.5 ms for 20 samples at 8 kHz)

l is the index of the local frequency [−L, . . . 0 . . . ,+L]

f(k) is the value of the nominal frequency f(k,l) is the value of a local frequency (6)

$$A(k, l) = \alpha(k, l) \left| \sum_{p=0}^{N_T-1} x_i(k, p) * w_l(p) \right|^2 \quad (7)$$

location of maximum= MAX[A(k, −L), . . . , A(k, 0), . . . , A(k, L)]

where $N_T$ is the total number of sub-frames in a segment. The results of equation 7 are power estimations for narrow frequency bands about the nominal frequencies of interest. Mathematically equation 7 represents the magnitude squared of the weighted DFT over one segment evaluated at local frequency about the frequency of interest. The matrix of α(k,l) values is selected such that the spectral windows obtained by multiplying the energy estimates intersect at the points determined by the frequency tolerance. The computation of A(k,l) and of the maximum of the values obtained allows us to determine the position of the maximum amplitude value with accuracy. In the preferred embodiment of this invention, a vector is used to indicate which bands are acceptable for having maximum amplitude and which are not.

Logical Processing

The logical processing block 306 determines, based on the information obtained from the previous quadrature 300, frame processing 303 and precision spectral processing blocks 304, if a valid tone has been detected. The logical processing block 306 is different for each class of signals as illustrated by the cascade of blocks in FIG. 3. For instance, in the case of MF and DTMF signalling, two and only two frequencies must be above the energy threshold while certain CPT tone are composed of single frequency tones. Furthermore, MF signalling the acceptance bands are ±1.5% ±5 Hz while for the DTMF the acceptance band is only ±1.5%.

In addition to evaluating the information supplied by the spectral processing stage, this block evaluates the temporal characteristics of the signal. In the case of MF and DTMF signals this temporal analysis is limited to short time duration signals typically in the range of 10 ms to 40 ms. In the case of CPT tones, this block also includes a cadence processing operation that compares the received cadence with a set of pre-determined values. Once either a valid tone or no tone has been detected, the result is sent to another device such as a controller 116 that uses the decoded information. Specifications as found in BellCore publications are shown in tables 1 through 6 in the previous pages of this document.

Here we will present a version of the logical processing block 306 applicable to MF tones. This design can be easily extended, although not directly applied, to other signalling modes. In a preferred embodiment of this invention applicable to MF tone, the logical processing stage comprises:

A power and energy evaluation devices which computes the power of the frequencies of interest.

A state machine comprising four states which are illustrated in FIG. 7 along with the permitted transition between them. These states are:
Waitoff 700—waiting for a pause
Toff 702—pause
Front 704—begin receiving tone
Ton 706—receiving tone Devices to compare computed values to pre-determined thresholds and centre frequencies.

Figure 8B:
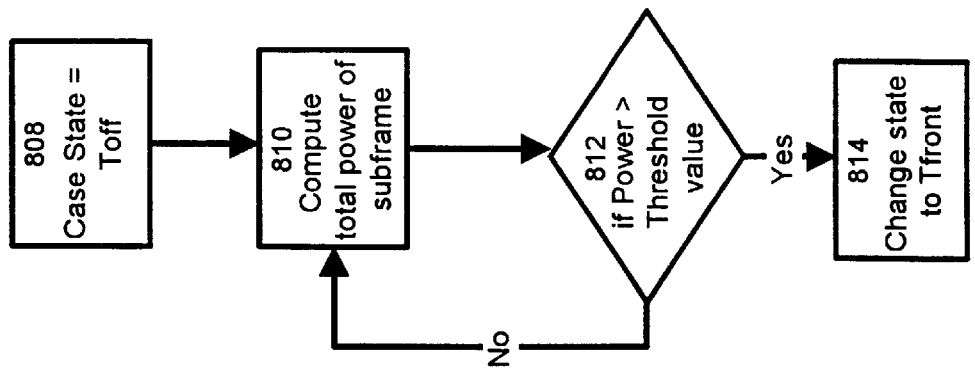
FIG. 8b shows a flow chart showing the decision process for the Toff state.
Figure 8A:
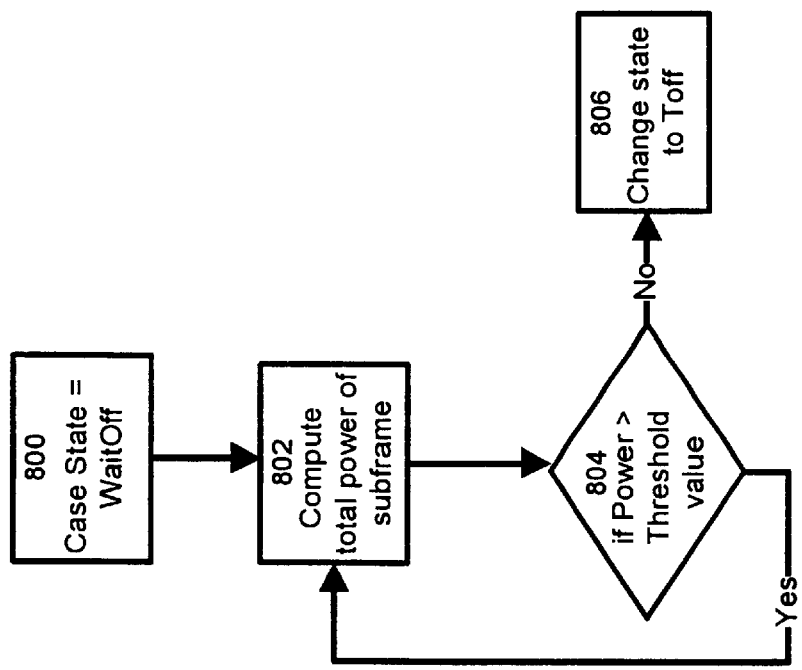
FIG. 8a shows a flow chart showing the decision process for the WaiToff state.
Figure 8C:
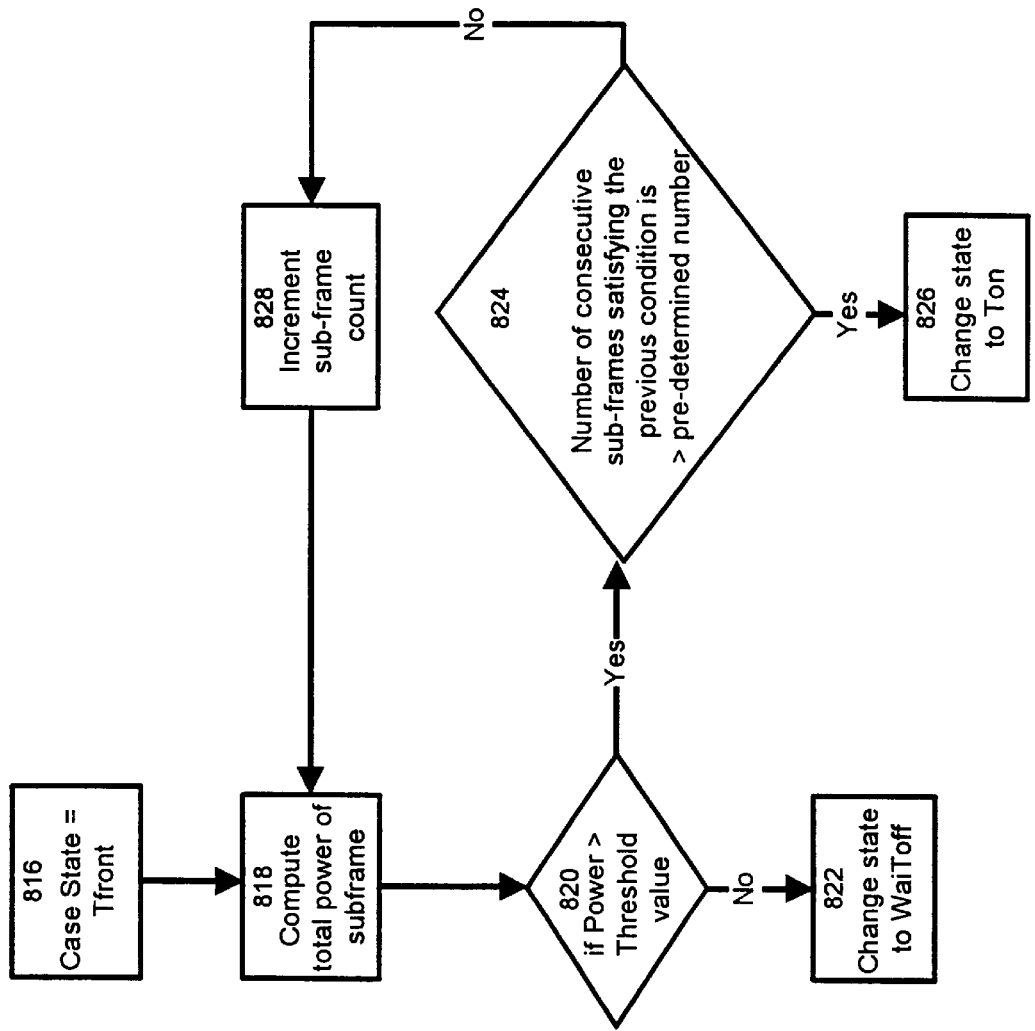
FIG. 8c shows a flow chart showing the decision process for the Tfront state.
Figure 8D:
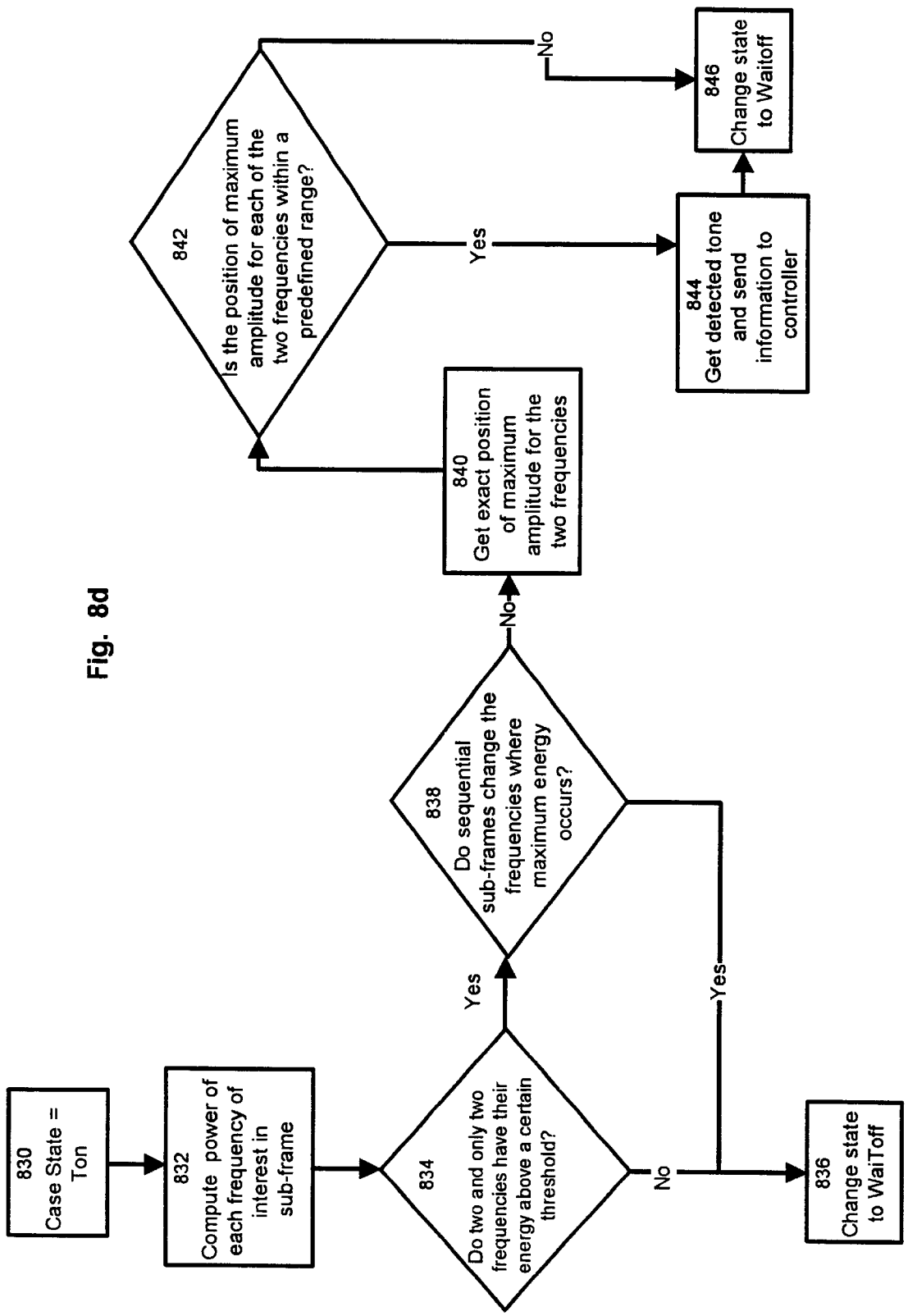
FIG. 8d shows a flow chart showing the decision process for the Ton state.

Initially the receiver is in the WaiToff 700 state where it waits for a pause. The receiver turns into the Toff 702 state if the combined energy in the frequencies of interest for MF is below a certain threshold for a pre-determined number of sub-frames. This can be done by performing the following computation:

$$\text{Power} = \sum_{k=1}^{6} |\xi_k|^2 \langle T_l$$

Where $T_l$ is the energy threshold and $\xi_k$ are the coefficients computed in the quadrature processing stage. This operation is shown as a flow chart in FIG. 8a. After the transition to Toff 702, in cases where the energy is above the threshold $T_l$, the receiver switches from the Toff state 702 to the Tfront state 704 where it begins receiving the tone. This operation is shown as a flow chart in FIGS. 8b and 8c. If this condition is met for a pre-determined number of sub-frames, the receiver moves on to the Ton 706 state otherwise it returns to the WaiToff 700 state. This operation is shown as a flow chart in FIG. 8d. The presence of the Tfront state allows recognizing the beginning of a tone by means of energy tests only. This is useful because of the fact that the location of the beginning of a tone is random with respect to the sub-frame boundaries, which makes it difficult to apply the spectral test. In the case where the beginning of the tone doesn't coincides with the beginning of a sub-frame the channel power will be spread over all frequency channels and, as a result, the threshold level will be exceeded in two or more channels or not exceeded at all. The front state also allows the reception of a tone correctly in cases where there is a time shift between the two frequency components.

Once the Ton state 706 is entered, processing is first performed both at the frame level and at the segment level. Several tests can be applied here in order to validate the candidate MF tone:

Two and only two frequency components have their amplitudes above a pre-determined threshold.

The location of the maximum amplitude among local frequencies for each of these two frequencies satisfies some pre-determined tolerance specification.

The energy of each frequency can be computed by taking the square of the magnitude of the DFT coefficients computed in the frame-processing block 303. If the conditions on the frequency and amplitude are satisfied for the frames then we have a candidate tone. If there are enough successive frames of the candidate tone then the final frequency tolerance testing is performed. The frequency deviation from the nominal can be evaluated by simply comparing the position of maximum amplitude computed by the precision spectral processing block 304 in equation 6 and comparing it to some pre-determined boundary values. In the case of dual tone, this frequency tolerance test may be performed only on the two frequencies of the candidate tone in order to minimize the computations. If all the conditions have been met, the recognized digit or control signal is sent to a controller and the logical processing block returns to the WaiToff 700 state.

From the structural point of view, the tone receiver, in accordance with this invention can be implemented on a digital signal processor (DSP) chip. The present embodiment was implemented using a 56 MHz Motorola 56002 digital signal processor (DSP) written in code able to execute on a 56001 DSP chips and the code is written in assembly language. Alternatively, a dedicated CPU and a memory unit connected to the CPU through a bus such that the memory contains instructions that direct the CPU to implement the functional blocks of the tone detection apparatus described above can also be used.

Although the present invention has been described in considerable detail with reference to certain preferred versions thereof, other versions are possible. For example in cases where new signalling must be introduced, it is sufficient to modify the parameters such as frequencies analysed and tolerance in order to use this invention. Therefore, the spirit and scope of the appended claims should not be limited to the description of the preferred embodiment described above.

We claim:

1. A tone detection apparatus, said apparatus comprising:
    an input for receiving a digital signal potentially containing a tone detectable by said apparatus;
    DFT computation means for computing a discrete Fourier transform coefficient for at least one candidate frequency for each sub-frame in a set of successive sub-frames of the digital signal, each sub-frame containing a plurality of signal samples, said DFT computation means computing a discrete Fourier transform for a given sub-frame of said set other than the first sub-frame of said set in a phase continuity relationship with a preceding sub-frame, said DFT computation means providing a phase offset for the given sub-frame to establish said phase continuity relationship with the preceding sub-frame;
    processing means utilising said discrete Fourier transform coefficient for each sub-frame in said set to determine if a predetermined tone exists in said digital signal.

2. An apparatus for detecting tones as defined in claim 1, wherein said processing means includes means for summing discrete Fourier transform coefficients associated with different sub-frames.

3. An apparatus for detecting tones as defined in claim 2, wherein said discrete Fourier transform generated for a first sub-frame in said set is computed by the following formula:

$$\xi_k(r) = \sum_{i=rN}^{rN+N-1} x_i \exp\{j2\pi f_k iT + \Phi_k\}$$

where:
a) $x_i$ designates the amplitude of the sample at time i;
b) r is the sub-frame number; k is the index of the frequency analysed;
c) $f_k$ is the frequency analysed;
d) T is the reciprocal of the sampling rate;
e) $\Phi_k$ is a constant designating a phase component;
f) N is the number of samples in the sub-frame;
g) j=sqrt (−1).

4. An apparatus as defined in claim 3, wherein the discrete Fourier transform generated for a second sub-frame of said set that follows said first sub-frame is computed by the following formula:

$$\xi_k(r) = \sum_{i=rN}^{rN+N-1} x_i \exp\{j2\pi f_k iT + \Phi_k\}$$

where:
a) $x_i$ designates the amplitude of the sample at time i;
b) r is the sub-frame number; k is the index of the frequency analysed;
c) $f_k$ is the frequency analysed;
d) T is the reciprocal of the sampling rate;
e) $\Phi_k$ is the phase offset for the second sub-frame and is equal to the value of the phase computed for the last sample of the first sub-frame;
f) N is the number of samples in the sub-frame;
g) j=sqrt (−1).

5. An apparatus for detecting tones as defined in claim 4, wherein said DFT computation means includes a look-up table.

6. An apparatus for detecting tones as defined in claim 5, wherein said look-up table contains values of either one of a sine and cosine values.

7. An apparatus for detecting tones as defined in claim 6, wherein said look-up table includes an index, said index including a plurality of entries, each entry being associated with either one of a sine and cosine value.

8. An apparatus as defined in claim 7, wherein each entry of said index is representative of a phase component.

9. An apparatus for detecting tones as defined in claim 3, wherein said DFT computation means includes at least one complex multiplier.

10. An apparatus as defined in claim 1, wherein said processing means is adapted for computing a discrete Fourier transform coefficient associated to the set of successive sub-frames on the basis of the discrete Fourier transform coefficients computed for said sub-frames of said set, the discrete Fourier transform coefficient associated to the set of successive sub-frames being associated to a candidate frequency.

11. An apparatus as defined in claim 10, wherein said processing means is adapted for computing a plurality of discrete Fourier transform coefficients associated to the set of successive sub-frames, each discrete Fourier transform coefficient associated to the set of successive sub-frames being associated to a respective frequency.

12. An apparatus as defined in claim 11, wherein said processing means provides means for computing:
    at least one discrete Fourier transform coefficient for the discrete Fourier transform coefficients computed for said sub-frames of said set at a first frequency that is less than a candidate frequency at which a tone is susceptible to be detected;
    at least one discrete Fourier transform coefficient for the discrete Fourier transform coefficients computed for said sub-frames of said set at a second frequency that is higher than a candidate frequency at which a tone is susceptible to be detected.

13. An apparatus as defined in claim 12, wherein said processing means provides means for computing a discrete Fourier transform coefficient for the discrete Fourier transform coefficients computed for said sub-frames of said set at a frequency that corresponds to the candidate frequency at which a tone is susceptible to be detected.

14. An apparatus as defined in claim 1, wherein said apparatus is capable of detecting MF tones.

15. An apparatus as defined in claim 1, wherein said apparatus is capable of detecting DTMF tones.

16. An apparatus as defined in claim 1, wherein said apparatus is capable of detecting CPT tones.

17. An apparatus as defined in claim 1, wherein said apparatus is capable of detecting MF-R2 tones.

18. An apparatus as defined in claim 1, including an analog-to-digital converter for outputting the digital signal.

19. In a tone detection apparatus, an improvement comprising:
    an input for receiving a digital signal potentially containing a tone detectable by said apparatus;
    first level DFT computation means for processing the digital signal to compute a plurality of discrete Fourier transform coefficients associated to a candidate frequency, each discrete Fourier transform coefficient being associated to a respective sub-frame in a set of successive sub-frames of the digital signal;

second level DFT computation means for computing at least one discrete Fourier transform coefficient associated to the set of successive sub-frames on the basis of the plurality of discrete Fourier transform coefficients computed by said first level DFT computation means.

20. The improvement as defined in claim 19, wherein said first level DFT computation means is adapted for computing a discrete Fourier transform for a given sub-frame of said set in a phase continuity relationship with a preceding sub-frame of said set.

21. The improvement as defined in claim 20, wherein said discrete Fourier transform generated for a first sub-frame in said set by said first level DFT computation means is computed by the following formula:

$$\xi_k(r) = \sum_{i=rN}^{rN+N-1} x_i \exp\{j2\pi f_k iT + \Phi_k\}$$

where:
a) $x_i$ designates the amplitude of the sample at time i;
b) r is the sub-frame number; k is the index of the frequency analysed;
c) $f_k$ the frequency analysed;
d) T is the reciprocal of the sampling rate;
e) $\Phi_k$ is a constant designating a phase component;
f) N is the number of samples in the sub-frame;
g) j=sqrt (−1).

22. The improvement as defined in claim 21, wherein the discrete Fourier transform generated by said first level DFT computation means for a second sub-frame of said set that follows said first sub-frame is computed by the following formula:

$$\xi_k(r) = \sum_{i=rN}^{rN+N-1} x_i \exp\{j2\pi f_k iT + \Phi_k\}$$

where:
a) $x_i$ designates the amplitude of the sample at time i;
b) r is the sub-frame number; k is the index of the frequency analysed;
c) $f_k$ is the frequency analysed;
d) T is the reciprocal of the sampling rate;
e) $\Phi_k$ is the phase offset for the second sub-frame and is equal to the value of the phase computed for the last sample of the first sub-frame;
f) N is the number of samples in the sub-frame;
g) j=sqrt (−1).

23. A method for detecting tones in a digital signal, said method comprising the steps of:
receiving a digital signal potentially containing a tone detectable by said apparatus;
computing a discrete Fourier transform coefficient for at least one candidate frequency for each sub-frame in a set of successive sub-frames of the digital signal, each sub-frame containing a plurality of signal samples, the computation of a discrete Fourier transform for a given sub-frame of said set other than the first sub-frame of said set being effected in a phase continuity relationship with a preceding sub-frame, the computation of a discrete Fourier transform for the given sub-frame including providing a phase offset to establish said phase continuity relationship with the preceding sub-frame;

utilising said discrete Fourier transform coefficient for each sub-frame in said set to determine if a predetermined tone exists in said digital signal.

24. In a method for detecting tones in a digital signal, an improvement comprising the steps of:
a) receiving a digital signal potentially containing a tone;
b) processing the digital signal to compute a plurality of discrete Fourier transform coefficients associated to a candidate frequency, each discrete Fourier transform coefficient being associated to a respective sub-frame in a set of successive sub-frames of the digital signal;
c) computing at least one discrete Fourier transform coefficient associated to the set of successive sub-frames on the basis of the plurality of discrete Fourier transform coefficients computed at step b).

25. The improvement as defined in claim 24, wherein step b) further comprises computing a discrete Fourier transform for a given sub-frame of said set in a phase continuity relationship with a preceding sub-frame of said set.

26. The improvement as defined in claim 25, wherein said discrete Fourier transform generated for a first sub-frame in said set is computed by the following formula:

$$\xi_k(r) = \sum_{i=rN}^{rN+N-1} x_i \exp\{j2\pi f_k iT + \Phi_k\}$$

where:
a) $x_i$ designates the amplitude of the sample at time i;
b) r is the sub-frame number; k is the index of the frequency analysed;
c) $f_k$ is the frequency analysed;
d) T is the reciprocal of the sampling rate;
e) $\Phi_k$ is a constant designating a phase component;
f) N is the number of samples in the sub-frame;
g) j=sqrt (−1).

27. The improvement as defined in claim 26, wherein the discrete Fourier transform generated for a second sub-frame of said set that follows said first sub-frame is computed by the following formula:

$$\xi_k(r) = \sum_{i=rN}^{rN+N-1} x_i \exp\{j2\pi f_k iT + \Phi_k\}$$

where:
a) $x_i$ designates the amplitude of the sample at time i;
b) r is the sub-frame number; k is the index of the frequency analysed;
c) $f_k$ is the frequency analysed;
d) T is the reciprocal of the sampling rate;
e) $\Phi_k$ is the phase offset for the second sub-frame and is equal to the value of the phase computed for the last sample of the first sub-frame;
f) N is the number of samples in the sub-frame;
g) j=sqrt (−1).

28. In a tone detection apparatus, an improvement comprising:
an input for receiving a digital signal potentially containing a tone detectable by said apparatus;
a first level DFT computation unit for processing the digital signal to compute a plurality of discrete Fourier transform coefficients associated to a candidate frequency, each discrete Fourier transform coefficient being associated to a respective sub-frame in a set of successive sub-frames of the digital signal;

a second level DFT computation unit for computing at least one discrete Fourier transform coefficient associated to the set of successive sub-frames on the basis of the plurality of discrete Fourier transform coefficients computed by said first level DFT computation unit.

29. The improvement as defined in claim 28, wherein said first level DFT computation unit is adapted for computing a discrete Fourier transform for a given sub-frame of said set in a phase continuity relationship with a preceding sub-frame of said set.

30. The improvement as defined in claim 29, wherein said discrete Fourier transform generated for a first sub-frame in said set by said first level DFT computation unit is computed by the following formula:

$$\xi_k(r) = \sum_{i=rN}^{rN+N-1} x_i \exp\{j2\pi f_k iT + \Phi_k\}$$

where:
a) $x_i$ designates the amplitude of the sample at time i;
b) r is the sub-frame number; k is the index of the frequency analysed;
c) $f_k$ is the frequency analysed;
d) T is the reciprocal of the sampling rate;
e) $\Phi_k$ is a constant designating a phase component;
f) N is the number of samples in the sub-frame;
g) j=sqrt (−1).

31. The improvement as defined in claim 30, wherein the discrete Fourier transform generated by said first level DFT computation unit for a second sub-frame of said set that follows said first sub-frame is computed by the following formula:

$$\xi_k(r) = \sum_{i=rN}^{rN+N-1} x_i \exp\{j2\pi f_k iT + \Phi_k\}$$

where:
a) $x_i$ designates the amplitude of the sample at time i;
b) r is the sub-frame number; k is the index of the frequency analysed;
c) $f_k$ is the frequency analysed;
d) T is the reciprocal of the sampling rate;
e) $\Phi_k$ is the phase offset for the second sub-frame and is equal to the value of the phase computed for the last sample of the first sub-frame;
f) N is the number of samples in the sub-frame;
g) j=sqrt (−1).

* * * * *